(12) United States Patent
Yamamoto et al.

(10) Patent No.: US 10,703,029 B2
(45) Date of Patent: Jul. 7, 2020

(54) PROCESS AND DEVICE FOR PRODUCING FOAMED MOLDED OBJECT

(71) Applicant: Maxell, Ltd., Kyoto (JP)

(72) Inventors: Satoshi Yamamoto, Suita (JP); Atsushi Yusa, Nagaokakyo (JP); Hideto Goto, Muko (JP)

(73) Assignee: MAXELL, LTD., Kyoto (JP)

( * ) Notice: Subject to any disclaimer, the term of this patent is extended or adjusted under 35 U.S.C. 154(b) by 531 days.

(21) Appl. No.: 15/498,815

(22) Filed: Apr. 27, 2017

(65) Prior Publication Data

US 2017/0225372 A1 Aug. 10, 2017

Related U.S. Application Data

(63) Continuation of application No. PCT/JP2015/080643, filed on Oct. 30, 2015.

(30) Foreign Application Priority Data

Oct. 31, 2014 (JP) .................................. 2014-222874

(51) Int. Cl.
 *B29C 44/34* (2006.01)
 *B29C 45/00* (2006.01)
 (Continued)

(52) U.S. Cl.
 CPC .......... *B29C 44/3446* (2013.01); *B29C 44/02* (2013.01); *B29C 44/42* (2013.01); *B29C 45/00* (2013.01); *B29C 45/0001* (2013.01); *C08J 9/08* (2013.01); *C08J 9/122* (2013.01); *B29K 2023/12* (2013.01); *B29K 2055/02* (2013.01);
 (Continued)

(58) Field of Classification Search
 CPC ..... B29C 44/3446; B29C 44/02; B29C 44/42; B29C 45/00; B29C 45/0001; B29C 45/46; B29C 45/48; B29C 2045/533; B29C 45/70; B29C 48/144; B29C 48/2513;
 (Continued)

(56) References Cited

U.S. PATENT DOCUMENTS 5,158,986 A 10/1992 Cha et al.
5,997,781 A 12/1999 Nishikawa et al.
(Continued)

FOREIGN PATENT DOCUMENTS

CN 1668441 A 9/2005
DE 10147070 A1 4/2003
(Continued)

OTHER PUBLICATIONS

Jan. 19, 2016 Written Opinion of the International Searching Authority issued in Patent Application No. PCT/JP2015/080643.
(Continued)

*Primary Examiner* — Stella K Yi
(74) *Attorney, Agent, or Firm* — Oliff PLC

(57) ABSTRACT

There is provided a method of producing a foamed molded product, including: plasticizing and melting a resin material containing a thermoplastic resin and a chemical foaming agent in a plasticizing cylinder in which a screw is provided, to provide a molten resin containing the chemical foaming agent; supplying a fluid with a fixed pressure into the plasticizing cylinder to pressurize the molten resin; and performing foam molding of the molten resin. The resin material contains 0.1 to 2% by weight of the chemical foaming agent.

19 Claims, 3 Drawing Sheets

(51) Int. Cl.
  *B29C 44/42* (2006.01)
  *C08J 9/12* (2006.01)
  *C08J 9/08* (2006.01)
  *B29C 44/02* (2006.01)
  *B29K 23/00* (2006.01)
  *B29K 55/02* (2006.01)
  *B29K 105/04* (2006.01)

(52) U.S. Cl.
  CPC ....... *B29K 2105/04* (2013.01); *C08J 2203/02* (2013.01); *C08J 2203/06* (2013.01); *C08J 2203/184* (2013.01); *C08J 2323/12* (2013.01); *C08J 2355/02* (2013.01)

(58) Field of Classification Search
  CPC ... B29C 48/2552; B29C 48/36; B29C 48/793; C08J 9/08; C08J 9/122
  See application file for complete search history.

(56) References Cited

U.S. PATENT DOCUMENTS

| | | |
|---|---|---|
| 6,435,853 B1 | 8/2002 | Teraoka et al. |
| 2002/0017734 A1 | 2/2002 | Sugihara et al. |
| 2004/0012107 A1 | 1/2004 | Xu et al. |
| 2004/0253335 A1 | 12/2004 | Anderson et al. |
| 2005/0143479 A1 | 6/2005 | Xu et al. |
| 2013/0285273 A1 | 10/2013 | Yusa et al. |

FOREIGN PATENT DOCUMENTS

| | | |
|---|---|---|
| EP | 2537658 A1 | 12/2012 |
| JP | 2 625 576 B2 | 7/1997 |
| JP | H11-034130 A | 2/1999 |
| JP | 2001-009882 A | 1/2001 |
| JP | 2002-079545 A | 3/2002 |
| JP | 2002-264164 A | 9/2002 |
| JP | 2003-191272 A | 7/2003 |
| JP | 3788750 B2 | 6/2006 |
| JP | 2008-142997 A | 6/2008 |
| JP | 4144916 B2 | 9/2008 |
| JP | 2009-202527 A | 9/2009 |
| JP | 2013-107402 A | 6/2013 |

OTHER PUBLICATIONS

Apr. 30, 2019 Chinese Office Action issued in Chinese Patent Application No. 201580056062.7.

Jan. 19, 2016 International Search Report issued in Patent Application No. PCT/JP2015/080643.

Jun. 15, 2018 Extended Search Report issued in European Patent Application No. 15853790.2.

EXAMPLE 1

| TERMINAL PART | CENTER PART | GATE PART |
|---|---|---|
|  |  |  |

COMPARATIVE EXAMPLE 1

| TERMINAL PART | CENTER PART | GATE PART |
|---|---|---|
|  |  |  |

COMPARATIVE EXAMPLE 3

| TERMINAL PART | CENTER PART | GATE PART |
|---|---|---|
|  |  |  |

PROCESS AND DEVICE FOR PRODUCING FOAMED MOLDED OBJECT

CROSS REFERENCE TO RELATED APPLICATION

This application is a Continuation Application of International Application No. PCT/JP2015/080643 which was filed on Oct. 30, 2015 claiming the conventional priority of Japanese patent Application No. 2014-222874 filed on Oct. 31, 2014.

BACKGROUND OF THE INVENTION

Field of the Invention

The present invention relates to a method (process) for producing a foamed molded product (foamed molded object, or foam molded product) and an apparatus (device) producing the same.

Description of the Related Art

In recent years, injection foam molding methods using supercritical nitrogen or carbon dioxide as a physical foaming agent have been studied and practically used (Patent Literature 1: Japanese Patent No. 2625576 corresponding to U.S. Pat. No. 5,158,986; Patent Literature 2: Japanese Patent No. 3788750; and Patent Literature 3: Japanese Patent No. 4144916 corresponding to U.S. Pat. No. 5,997,781). According to each of Patent Literatures 1 to 3, the injection foam molding method using the physical foaming agent is performed as follows. First, the physical foaming agent is introduced into a hermetically closed plasticizing cylinder, and the physical foaming agent is brought in contact with and dispersed in a plasticized and melted resin. The molten resin, in which the foaming agent is dispersed, is measured while maintaining high pressure in the plasticizing cylinder to such an extent that the physical foaming agent is in a supercritical state, and then the molten resin is injected and charged into a mold. The supercritical fluid, which has been compatibly dissolved in the molten resin, is subjected to sudden pressure reduction and gasified at the time of injection and charging. The molten resin is solidified, and thus foams (foamed cells) are formed at the inside of the molded product.

Patent Literature 4 (Japanese Patent Application Laid-open No. 2013-107402 corresponding to U.S. Patent Application Publication No. 2013/0285273) discloses an injection foam molding method using a physical foaming agent, wherein the physical foaming agent in a molten resin is partially separated from the molten resin in the middle of molding, and the separated physical foaming agent is discharged to the outside of a plasticizing cylinder (kneading apparatus). Patent Literature 4 discloses the kneading apparatus including a vent from which the physical foaming agent is discharged and a mechanism that keeps the pressure of an area having the vent (pressure reduction zone) constant.

Meanwhile, a method for producing a foamed molded product using a chemical foaming agent in place of the physical foaming agent is suggested. In the method, a foaming agent that is decomposed by heat generated when a thermoplastic resin is plasticized and melted, is added to the thermoplastic resin, and foams (foamed cells) are formed at the inside of the molded product by gas generated when the foaming agent is decomposed. The molding method using the chemical forming agent eliminates an apparatus supplying the physical foaming agent, thus making it possible to reduce apparatus costs.

Patent Literature 5 (Japanese Patent Application Laid-open No. 2002-264164) discloses a method of producing a foamed molded product using a physical foaming agent and a chemical foaming agent in combination. According to Patent Literature 5, the amount of chemical foaming agent used can be reduced and foamed cells can be fine or minute by mixing, at a fixed ratio, a thermoplastic resin with hydrogen carbonate and carboxylate as chemical foaming agents and using a physical foaming agent with high pressure.

In the injection foam molding method using the physical foaming agent described in each of Patent Literatures 1 to 3, when concentration of the physical foaming agent in the molten resin is high, a phase separation between the molten resin and the physical foaming agent might occur. Thus, the concentration of the physical foaming agent needs to be decreased to about ⅕ to 1/10 of saturated solubility. In order to form many foaming nuclei during injection and charging into the mold, the physical foaming agent introduced into the plasticizing cylinder needs to be set to have high pressure and the introduced amount thereof needs to be measured precisely in a state where the concentration of the physical foaming agent in the molten resin is set to be lower than the saturated solubility. Those needs complicate a supply apparatus for the physical foaming agent, thus increasing apparatus initial costs.

In the injection foam molding method using the physical foaming agent described in Patent Literature 4, the kneading apparatus can increase concentration of the physical foaming agent in the molten resin almost to the saturated solubility (saturated concentration) after discharging a part of the physical foaming agent. This makes it possible to form many foaming nuclei by using the physical foaming agent with relatively low pressure.

The injection foam molding method described in Patent Literature 4, however, has the following problems. Inert gases, such as carbon dioxide and nitrogen, used as the physical foaming agent are not likely to dissolve in resin. When the thermoplastic resin having low compatibility with inert gases is used in a state where pressure in the pressure reduction zone is low, the foaming nuclei are not formed at the inside of the molded product sufficiently, which could cause increase in cell size and decrease in cell density. Meanwhile, when the pressure in the pressure reduction zone is high, the foamed cell size is reduced and the cell density is increased. In that case, however, there is a problem that separation between the molten resin and the physical foaming agent easily occurs and any unsatisfactory appearance, such as a swirl mark and swell, is likely to be present on a surface of the molded product.

The foam molding method using the chemical foaming agent has the following problem. In the foam molding method using the chemical foaming agent, when a small amount of the foaming agent is used, foamed cells are not formed sufficiently. Thus, for example, the chemical foaming agent is required to be added to the thermoplastic resin in a large amount exceeding 2% by weight. The chemical foaming agent is expensive, thus increasing material costs of the molded product. Further, dirt caused by decomposition residues from the chemical foaming agent is likely to adhere to the molding machine and mold, causing molding failure.

In the method using the chemical foaming agent and physical foaming agent in combination described in Patent Literature 5, the physical foaming agent with high pressure needs to be controlled such that it is introduced into the plasticizing cylinder at a specific timing in one cycle of the molding step. This requires a complicated control apparatus and an introducing mechanism for introducing the physical foaming agent, thus increasing apparatus costs.

The present teaching is made to solve the various problems related to the methods of producing the foamed molded product. According to the present teaching, there is provided a method of producing a foamed molded product using a physical foaming agent and a chemical foaming agent in combination, wherein the amount of chemical foaming agent used may be reduced, and a complicated control apparatus for a fluid functioning as the physical foaming agent may be omitted or simplified.

SUMMARY OF INVENTION

According to a first aspect of the present teaching, there is provided a method of producing a foamed molded product, including:

plasticizing and melting a resin material containing a thermoplastic resin and a chemical foaming agent in a plasticizing cylinder in which a screw is provided, to provide a molten resin containing the chemical foaming agent;

supplying a fluid with a fixed pressure into the plasticizing cylinder to pressurize the molten resin; and performing foam molding of the molten resin, wherein the resin material contains 0.1 to 2% by weight of the chemical foaming agent.

In the first aspect, the fixed pressure may be in a range of 1 to 10 MPa. The fluid may be a physical foaming agent, carbon dioxide, nitrogen, or air. The method according to the first aspect may include taking out the fluid which has been depressurized to the fixed pressure by a pressure reduction valve, from a tank or bottle storing the fluid, wherein the molten resin may be pressurized by the fluid taken out from the tank. The chemical foaming agent may contain hydrogen carbonate. The chemical foaming agent may be sodium hydrogen carbonate.

In the first aspect, the plasticizing cylinder may include a starvation zone which is not full of the molten resin, and the molten resin in the starvation zone may be pressurized by the fluid at the fixed pressure. The molten resin in the starvation zone may be in contact with the fluid at the fixed pressure. Pressure in the starvation zone may be kept at the fixed pressure. The plasticizing cylinder may be provided with a mechanism configured to increase flow resistance of the molten resin on an upstream side of the starvation zone in a flowing direction of the molten resin. In the plasticizing cylinder, a compression zone and the starvation zone may be provided to be adjacent to each other in that order from an upstream side in a flowing direction of the molten resin. A mechanism configured to increase flow resistance of the molten resin may be provided between the compression zone and the starvation zone so that pressure of the molten resin in the compression zone is increased and the starvation zone is not full of the molten resin. The starvation zone of the plasticizing cylinder may be provided with an introducing port through which the fluid is introduced into the starvation zone. The fluid may be introduced from the introducing port to the starvation zone at the fixed pressure.

In the first aspect, the fluid with the fixed pressure may be continuously supplied into the plasticizing cylinder during production of the foamed molded product. The resin material may be plasticized and the foam molding of the molten resin may be performed while the fluid with the fixed pressure is continuously supplied into the plasticizing cylinder. Pressurizing the molten resin may correspond to pressurizing the molten resin at the fixed pressure by continuously supplying the fluid with the fixed pressure into the plasticizing cylinder while flowing the molten resin in a predefined flowing direction in the plasticizing cylinder.

According to a second aspect of the present teaching, there is provided a production apparatus for a foamed molded product, including: a plasticizing cylinder configured to plasticize and melt a resin material to provide a molten resin and including a starvation zone which is not full of the molten resin, and a fluid supply mechanism configured to continuously supply a fluid with a fixed pressure to the starvation zone of the plasticizing cylinder during production of the foamed molded product.

The plasticizing cylinder may further include a mechanism configured to increase flow resistance of the molten resin at an upstream side of the starvation zone in a flowing direction of the molten resin. The plasticizing cylinder may further include a compression zone provided to be adjacent to the starvation zone at an upstream side of the starvation zone in a flowing direction of the molten resin and a mechanism provided between the compression zone and the starvation zone to increase flow resistance of the molten resin, and the mechanism may be configured to increase pressure of the molten resin in the compression zone and not to be full of the molten resin in the starvation zone.

The starvation zone of the plasticizing cylinder may be provided with an introducing port through which the fluid is introduced into the starvation zone. The introducing port may have an inner diameter which is 15 to 100% of an inner diameter of the plasticizing cylinder. No driving valve may be provided in the introducing port.

DESCRIPTION OF THE PREFERRED EMBODIMENT

Figure 1:
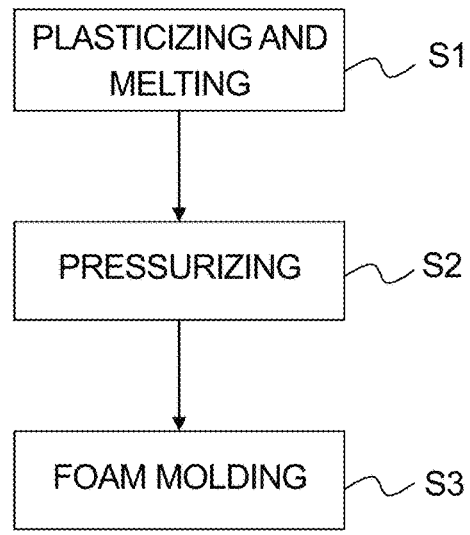
FIG. 1 is a flow chart indicating a method for producing a foamed molded product of an embodiment of the present teaching.

A method of producing a foamed molded product (foam molded product) according to the present teaching will be explained with reference to a flow chart of FIG. 1. In this embodiment, the foamed molded product is produced by using a production apparatus (injection molding apparatus) 1000 depicted in FIG. 2. The production apparatus 1000 mainly includes a plasticizing cylinder 210 in which a screw 20 is provided, a fluid supply mechanism (tank or bottle) 100 that supplies a fluid into the plasticizing cylinder 210, a clamping unit 250 provided with a mold, and a control unit (not depicted in the drawings) that controls operations of the plasticizing cylinder 210 and the clamping unit 250. In the plasticizing cylinder 210, a molten resin plasticized and melted flows from the right to left in FIG. 2. Thus, the right in FIG. 2 is defined as "upstream" or "backward", and the left in FIG. 2 is defined as "downstream" or "forward (frontward)" at the inside of the plasticizing cylinder 210 of this embodiment.

Figure 2:
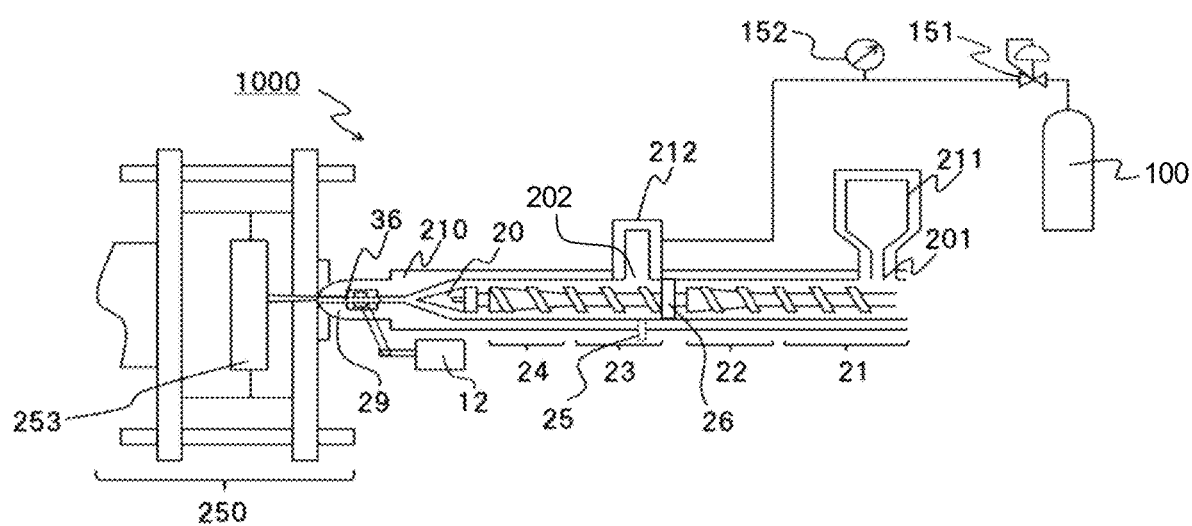
FIG. 2 schematically depicts an apparatus for producing the foamed molded product used in the embodiment.

First, a resin material containing a thermoplastic resin and a chemical foaming agent is plasticized and melted, thus obtaining a molten resin containing the chemical foaming agent (step S1 of FIG. 1).

Various resins can be used as the thermoplastic resin depending on the type of the objective molded product (product to be molded). Specifically, it is possible to use, for example, thermoplastic resins including polypropylene, polymethyl methacrylate, polyamide, polycarbonate, amorphous polyolefin, polyether imide, polyethylene terephthalate, polyether ether ketone, acrylonitrile butadiene styrene copolymer (ABS resin), polyphenylene sulfide, polyamide imide, polylactic acid, polycaprolactone, and the like, and composite materials thereof. The above-listed thermoplastic resins may be used individually or combining two more kinds. Further, it is also possible to use those obtained by kneading various inorganic fillers, such as glass fiber, talc, and carbon fiber, with the thermoplastic resin(s). The thermoplastic resin is preferably one that is plasticized and melted in a temperature range in which the chemical foaming agent added is decomposed to generate gas.

The chemical foaming agent is not particularly limited, provided that it is decomposed at a temperature at which the thermoplastic resin is plasticized and melted to generate foaming gas. Those usable as the chemical foaming agent include, for example, organic foaming agents such as azodicarbonamide (ADCA), N,N'-dinitrosopentamethylenetetramine, 4,4'-oxybis(benzenesulfonylhydrazide), diphenylsulfone-3,3'-disulfonylhydrazide, p-toluene sulfonylsemicarbazide, trihydrazinotriazine, and azobisisobutyronitrile; a mixture of a polycarboxylic acid and an inorganic carbonate compound, examples of the polycarboxylic acid including citric acid, oxalic acid, fumaric acid, phthalic acid, malic acid, tartaric acid, cyclohexane-1,2-dicarboxylic acid, camphoric acid, ethylenediaminetetraacetic acid, triethylenetetramine hexa-acetic acid, and nitrilo acid, examples of the inorganic carbonate compound including sodium hydrogen carbonate, sodium aluminum hydrogen carbonate, potassium hydrogen carbonate, ammonium hydrogen carbonate, and ammonium carbonate; and salts of polycarboxylic acids such as sodium dihydrogen citrate and potassium oxalate. The above-listed chemical foaming agents may be used individually or combining two more kinds. From a viewpoint of by-products or subsidiary products generated at the time of decomposition, any inorganic foaming agent including, for example, hydrogen carbonate is preferably used, especially sodium hydrogen carbonate is preferably used. Most of the by-products generated when the hydrogen carbonate, such as sodium hydrogen carbonate, is decomposed are carbon dioxide and water. These are not likely to dirty the production apparatus and the mold.

The resin material contains 0.1 to 2% by weight of the chemical foaming agent. Further, the resin material contains the chemical foaming agent preferably in an amount of 0.1 to 1% by weight, more preferably in an amount of 0.1 to 0.5% by weight. When the resin material contains the chemical foaming agent in an amount of less than 0.1% by weight, sufficient foaming performance would not be obtained. When the resin material contains the chemical foaming agent in an amount exceeding 2% by weight, contaminations caused by the by-products of the chemical foaming agent could adhere to the mold, an extrusion die, and the like, and dirty a surface of the foamed molded product. In this embodiment, an after-mentioned fluid that pressurizes the molten resin is considered to function as the physical foaming agent, thus making it possible to form the foamed molded product with a small amount (0.1 to 2% by weight) of the chemical foaming agent. Since the expensive chemical foaming agent is used in a small amount, material cost can be reduced as well as the amount of the by-products generated when the chemical foaming agent is decomposed can be reduced. If a large amount of the chemical foaming agent is used, cleaning of the mold and the like is required to be performed frequently to remove the by-products. This embodiment eliminates that need, thus improving productivity of the foamed molded product.

The thermoplastic resin is a main component of the resin material. For example, the resin material may contain 40 to 99.9% by weight of the thermoplastic resin. The resin material of this embodiment may appropriately contain, in addition to the thermoplastic resin and the chemical foaming agent, general-purpose various additives such as the above-described inorganic fillers.

In this embodiment, the resin material is plasticized and melted in the plasticizing cylinder 210 depicted in FIG. 2 in which the screw 20 is provided. A band heater (not depicted in the drawings) is arranged on an outer wall surface of the plasticizing cylinder 210. The band heater heats the plasticizing cylinder 210, thus plasticizing and melting the thermoplastic resin.

In this embodiment, the molten resin is pressurized by supplying a fluid with a fixed pressure (constant pressure or given pressure) into the plasticizing cylinder 210 (step S2 of FIG. 1). In the present application, "fluid" means any of a liquid, a gas, and a supercritical fluid. The fluid used in this embodiment is a pressurized fluid with the fixed pressure. In this embodiment, the molten resin may be pressurized by continuously supplying the fluid with the fixed pressure into the plasticizing cylinder 210 while allowing the molten resin to flow in a predefined direction (flowing direction) in the plasticizing cylinder 210.

In foam molding using conventional physical foaming agents, a predefined amount of the physical foaming agent with high pressure is forcibly introduced into a molten resin within a given time. In that case, the physical foaming agent needs to have raised pressure, and the introduction amount of the physical foaming agent into the molten resin, the introduction time, and the like need to be controlled accurately. The physical foaming agent is allowed to make contact with the molten resin during the short introduction time only. Meanwhile, in this embodiment, the fluid is not introduced into the molten resin forcibly, but the fluid with the relatively low fixed pressure is continuously supplied into the plasticizing cylinder while the molten resin is flowing in the flowing direction. This allows the fluid to be in contact continuously with the molten resin, thereby pressurizing the molten resin. In this embodiment, the fluid with the fixed pressure is continuously supplied into the plasticizing cylinder during manufacture of the foamed molded product. Namely, the method of producing the foamed molded product that includes plasticizing and melting of the resin material as described above (step S1 of FIG. 1) and foam molding of the molten resin as described later (step S3) is performed in a state where the fluid with the fixed pressure is continuously supplied into the plasticizing cylinder.

The wording "the molten resin is pressurized by the fluid at the fixed pressure" means that the fluid with the fixed pressure is brought into contact with the molten resin or the fluid brought into contact with the molten resin is subject to pressure adjustment to have the fixed pressure. In this embodiment, for example, when injection molding of multiple shots is performed successively, the molten resin for the next shot is prepared in the plasticizing cylinder even when an injection step, a cooling step for the molded product, and a taking-out step for the molded product are being performed. Namely, the molten resin for the next shot is also pressurized by the fluid with the fixed pressure. Accordingly, in the injection molding of multiple shots performed successively, one cycle of the injection molding including the plasticization and measurement steps, injection step, cooling step for the molded product, taking-out step, and the like is performed in a state where the molten resin and the fluid with the fixed pressure are constantly present and are in contact continuously with each other in the plasticizing cylinder, that is, in a state where the molten resin in the plasticizing cylinder is continuously pressurized by the fluid with the fixed pressure. Similarly, also when continuous molding such as extrusion molding is performed, the molding is performed in a state where the molten resin and the fluid with the fixed pressure are constantly present and are in contact continuously with each other in the plasticizing cylinder, that is, in a state where the molten resin in the plasticizing cylinder is continuously pressurized by the fluid with the fixed pressure.

Although the fluid of this embodiment has pressure lower than those of conventional physical foaming agents, the fluid of this embodiment is in contact continuously with the molten resin. This may allow a necessary and sufficient amount of the fluid in this embodiment to permeate the molten resin and to function as the physical foaming agent. In this embodiment, the molten resin containing the chemical foaming agent is continuously pressurized by the fluid with pressure higher than foaming pressure of the chemical foaming agent. This reduces foaming of the chemical foaming agent in the molten resin before molding, thus improving foaming efficiency in the mold. Since this embodiment eliminates control of the fluid introduction amount, control of the fluid introduction time, and the like, drive valves such as a check valve and an electromagnetic valve as well as a control mechanism controlling them are unnecessary. This reduces apparatus costs. The fluid used in this embodiment has pressure lower than those of conventional physical foaming agents, thus reducing a load on the apparatus.

As the fluid, carbon dioxide, nitrogen, air, or the like is preferably used from a viewpoint of costs and an environmental load. Those fluids may function as the physical foaming agent. Since the fluid of this embodiment has relatively low pressure, for example, a fluid taken out from a tank or bottle storing the fluid, such as a nitrogen tank, carbon oxide tank, or air tank and then depressurized to the fixed pressure with a pressure reduction valve, can be used as the fluid of this embodiment. In that case, a pressure boosting apparatus is unnecessary, thus reducing total costs for the production apparatus. The fluid of which pressure is increased to a predefined pressure may be used as the fluid pressurizing the molten resin, if necessary. For example, when air is used as the fluid, air around the production apparatus may be used after the pressure thereof is raised to a predefined pressure.

The pressure pressurizing the molten resin is fixed or constant, preferably in a range of 1 to 10 MPa, more preferably in a range of 1 to 6 MPa, further preferably in a range of 3 to 6 MPa. Making the pressure of the fluid 1 MPa or more allows a necessary and sufficient amount of the fluid to permeate the molten resin as well as reduces foaming of the chemical foaming agent. Making the pressure of the fluid 10 MPa or less reduces a load on the apparatus. Since the chemical foaming agent is used in combination with the fluid in this embodiment, the pressure of the fluid can be set to pressure lower than those of conventional physical foaming agents. Although the pressure of the fluid is low, the fluid is in contact continuously with the molten resin. This allows a necessary and sufficient amount of the fluid in this embodiment to permeate the molten resin. The wording the pressure of the fluid pressurizing the molten resin is "fixed" means that the variation range of pressure relative to a predefined pressure is preferably within ±10%, more preferably within ±5%.

In this embodiment, the fluid is introduced from the tank 100 depicted in FIG. 2 into the plasticizing cylinder 210, and the molten resin in the plasticizing cylinder 210 is continuously pressurized by the fluid with the fixed pressure introduced therein. The fluid is depressurized to a predefined pressure with a pressure reduction valve 151 provided at an exit of the tank 100, and then introduced into the plasticizing cylinder 210 without passing any pressure boosting apparatus and the like.

The plasticizing cylinder 210 used in this embodiment includes a starvation zone 23 that is not full of the molten resin and a compression zone 22 arranged upstream of and adjacent to the starvation zone 23, in which the molten resin is compressed to increase the pressure. A mechanism (ring) 26 increasing the flow resistance of the molten resin is provided between the compression zone 22 and the starvation zone 23 to reduce the flow amount of the resin supplied from the compression zone 22 to the starvation zone 23. Thus, the molten resin is compressed in the upstream compression zone 22 to increase the pressure and the downstream starvation zone 23 is not full of the molten resin (the downstream starvation zone 23 is starved of the molten resin). In order to accelerate the starvation of the molten resin, the screw 20 has a structure as described below. A part of a shaft of the screw 20 positioned in the starvation zone 23 (i.e., downstream of the ring 26) is thinner than that positioned in the compression zone 22 (i.e., upstream of the ring 26), and a screw flight of the screw 20 positioned in the starvation zone 23 is deeper than that positioned in the compression zone 22.

Figure 3:
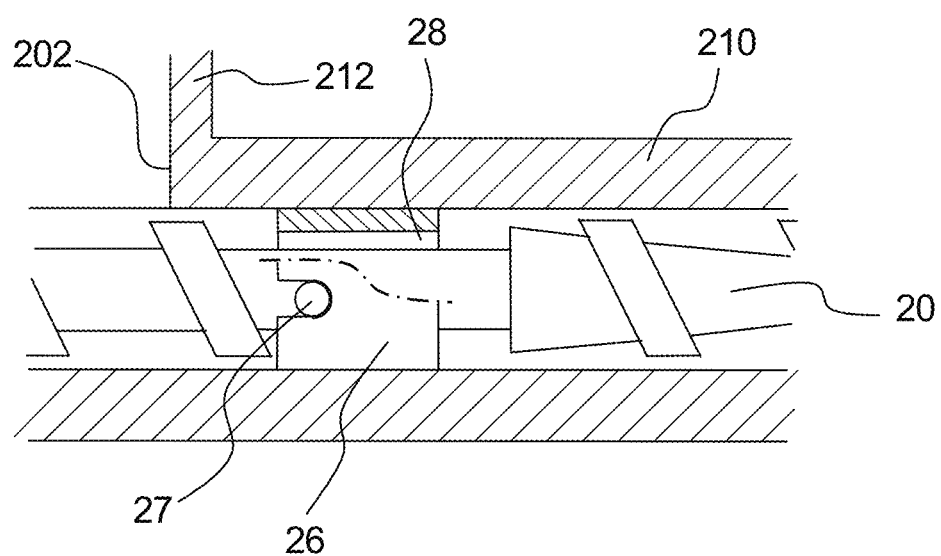
FIG. 3 is a partial enlarged view of the producing apparatus depicted in FIG. 2.

The mechanism 26 that is disposed between the compression zone 22 and the starvation zone 23 to increase the flow resistance of the molten resin may be any mechanism that temporarily reduces a flow passage area through which the molten resin passes, so as to restrict the flow amount of the resin supplied from the compression zone 22 to the starvation zone 23. In this embodiment, the ring 26 is used as the mechanism increasing the flow resistance. As depicted in FIG. 3, the ring 26 is a half-cut shaped ring of which position and rotating motion are fixed to the screw 20 with a pin 27 provided in the screw 20. Making the inner diameter of the ring 26 and a clearance 28 of the screw 20 the flow passages for the molten resin increases the flow resistance of the molten resin. Other examples of the mechanism increasing the flow resistance of molten resin may be a part of the screw having a screw diameter larger than those of other parts, a part of the screw having the screw flight provided in an opposite direction to other parts, and the like. The part having a large screw diameter reduces the clearance between the inner diameter of the cylinder and the screw, and the part having the screw flight provided in an opposite direction to a resin supply direction reduces the supply amount of the resin supplied downstream. The respective parts can increase the flow resistance of molten resin. Thus, the mechanism increasing the flow resistance of the molten resin may be provided in the screw as a ring that is a member different from the screw, or may be provided integrally with the screw as a part of the screw structure. When the mechanism increasing the flow resistance of the molten resin is formed as the ring independently of the screw, the size of the clearance that is the flow passage of the molten resin can be changed by changing the ring. This results in an advantage that the degree of flow resistance of molten resin can be changed easily.

In this embodiment, the fluid is continuously introduced into the starvation zone 23 and the molten resin in the starvation zone 23 is continuously pressurized by the fluid with the fixed pressure. The starvation zone 23, which is not full of the molten resin (which is starved of the molten resin), has a space where the fluid is present, thus making it possible to pressurize the molten resin efficiently. Further, since inner pressure of the resin decreases in the starvation zone 23, the fluid with low pressure can be introduced into the plasticizing cylinder 210 relatively easily. In this embodiment, the fluid with the fixed pressure is in contact continuously with the molten resin in the starvation zone 23, and the pressure in the starvation zone 23 is constantly controlled to the fixed pressure.

The starvation zone 23 of the plasticizing cylinder 210 is provided with an introducing port 202 through which the fluid is introduced into the starvation zone 23. This embodiment eliminates control of the introduction amount of the fluid introduced into the plasticizing cylinder 210, control of the introduction time, and the like, and thus mechanisms controlling them, for example, drive valves using a check valve, electromagnetic valve, and the like, are unnecessary. The introducing port 202 having no drive valve is open at all times, and the fluid that has been reduced to a predefined pressure by the pressure reduction valve 151 is continuously introduced into the plasticizing cylinder 210 through the always-opened introducing port 202. The introducing port 202 of this embodiment has an inner diameter larger than those of introducing ports for the physical foaming agent with high pressure of conventional production apparatuses. This allows the fluid with relatively low pressure to be introduced into the plasticizing cylinder 210 efficiently. Specifically, the inner diameter of the introducing port 202 is preferably 15 to 100% of the inner diameter of the plasticizing cylinder 210, more preferably 15 to 50% of the inner diameter of the plasticizing cylinder 210. When the inner diameter of the introducing port 202 is too small, the fluid can not be introduced into the plasticizing cylinder 210 efficiently. This makes it difficult to pressurize the molten resin sufficiently. When the inner diameter of the introducing port 202 is too large, the molten resin partially accumulates in the introducing port 202. This could cause molding failure. Meanwhile, in the starvation zone 23, the flight of the screw 20 is deep and the resin amount to be accumulated may be small. Thus, even when the diameter of the introducing port 202 is large, the molten resin is prevented from overflowing the introducing port 202.

Subsequently, the molten resin containing the chemical foaming agent is subjected to foam molding (step S3 of FIG. 1). The molding method is not particularly limited, and the molded product may be molded, for example, by injection foam molding, extrusion foam molding, foam blow molding, or the like. In this embodiment, the injection foam molding is performed by injecting the molten resin from the plasticizing cylinder 210 depicted in FIG. 2 to charge a cavity 253 of the mold with the molten resin. As the injection foam molding, it is possible to use a short shot method in which the mold cavity is charged with the molten resin in an amount corresponding to 75 to 95% of the mold cavity capacity and the mold cavity is filled with the molten resin as each foam size gets larger, or a core back method in which the mold cavity is filled with the molten resin in an amount corresponding to 100% of the mold cavity capacity and foaming is performed after increase in the cavity capacity. The obtained foamed molded product includes foamed cells inside, which reduces contraction of the thermoplastic resin upon cooling. This reduces warpage of the molded product, thus resulting in the molded product having low density.

As explained above, according to the production method of the present teaching, the content of the chemical foaming in the resin material may be reduced to a small amount (0.1 to 2% by weight). Since the amount of the expensive chemical foaming agent used can be reduced, it is possible to reduce material costs of the molded product and to prevent adhesion of contamination to the mold and the like which would be otherwise caused by by-products or subsidiary products of the chemical foaming agent. Further, the production method of the present teaching eliminates control of the introduction amount of the fluid functioning as the physical foaming agent into the molten resin, control of the introduction time, and the like. Thus, any complicated control apparatus may be omitted or simplified, thus reducing apparatus costs. The fluid used in the present teaching has a pressure lower than those of conventional physical foaming agents, thus reducing a load on the apparatus.

EXAMPLES

In the following, the present teaching will be explained more specifically based on examples and comparative examples. The present teaching, however, is not limited to those.

Example 1

In this example, a foamed molded product was produced by using an ABS resin as the thermoplastic resin and sodium hydrogen carbonate ($NaHCO_3$) that is hydrogen carbonate as the chemical foaming agent. Specifically, a resin material was obtained by mixing ABS resin pellets ("TOYOLAC 500" produced by TORAY INDUSTRIES, INC.) containing no glass fiber and the like with master batch pellets ("Cellmike MB" produced by SANKYO KASEI CO., LTD.) containing 20% by weight of sodium hydrogen carbonate powder, and the resin material was made to contain 0.2% by weight of sodium hydrogen carbonate. The foamed molded product was made from the resin material by use of the production apparatus 1000 depicted in FIG. 2. Nitrogen was used as the fluid pressurizing a molten resin.

(1) Production Apparatus

At first, the production apparatus 1000 depicted in FIG. 2 and used in this example will be explained. As described above, the production apparatus 1000, which is an injection molding apparatus, mainly includes the plasticizing cylinder 210 in which the screw 20 is provided, the fluid supply mechanism (tank or bottle) 100 that supplies the fluid into the plasticizing cylinder 210, the clamping unit 250 provided with the mold, and the control unit (not depicted in the drawings) that controls operations of the plasticizing cylinder 210 and the clamping unit 250.

A shutoff valve 36, which is opened/closed in accordance with driving of an air cylinder 12, is provided at a nozzle forward end 29 of the plasticizing cylinder 210 so that the interior of the plasticizing cylinder 210 can be retained at high pressure. The mold is brought in tight contact with the nozzle forward end 29, and the molten resin is injected from the nozzle forward end 29 to charge the cavity 253 of the mold. Those formed on the upper side surface of the plasticizing cylinder 210 are, as referred to in the following order from the upstream side, a resin supply port 201 for supplying the resin material into the plasticizing cylinder 210 and the introducing port 202 for introducing the fluid into the plasticizing cylinder 210. A resin supplying hopper 211 is arranged for the resin supply port 201 and a small container 212 is arranged for the introducing port 202. The small container 212 is connected to the tank 100 via the pressure reduction valve 151 and a pressure gauge 152. A sensor 25 monitoring pressure is provided on the lower side surface of the plasticizing cylinder 210, at a position opposed to the introducing port 202.

The screw 20 is arranged rotatably and movably back and forth in the plasticizing cylinder 210 to accelerate plasticization and melting of the thermoplastic resin and to measure and inject the molten resin. As described above, the screw 20 is provided with the ring 26 in the half-cut shape depicted in FIG. 3 as the mechanism increasing the flow resistance of the molten resin.

In the plasticizing cylinder 210, the thermoplastic resin is supplied from the resin supply port 201 into the plasticizing cylinder 210, and the thermoplastic resin is plasticized by the band heater (not depicted in the drawings) to provide the molten resin which is fed to the downstream in accordance with the forward rotation of the screw 20. On the upstream side of the ring 26, the ring 26 provided in the screw 20 compresses the molten resin to increase the pressure of the molten resin, and on the downstream side of the ring 26, the plasticizing cylinder 210 is not full of the molten resin (the plasticizing cylinder 210 is starved of the molten resin). The resin fed to further downstream is recompressed and measured in the vicinity of the forward end of the plasticizing cylinder 210 before injection.

Accordingly, in the plasticizing cylinder 210, there are formed a plasticizing zone 21 in which the thermoplastic resin is plasticized and melted, the compression zone 22 in which the molten resin is compressed to increase the pressure, the starvation zone 23 that is not full of the molten resin, and a recompression zone 24 in which the molten resin depressurized in the starvation zone is recompressed, as referred to in that order from the upstream side. The ring 26 provided in the screw 20 is positioned between the compression zone 22 and the starvation zone 23. The introducing port 202 through which the fluid is introduced is provided in the starvation zone 23. In order to accelerate permeation of the fluid into the molten resin, the screw 20 may include multiple rings 26 and the plasticizing cylinder 210 may include multiple introducing inlets 202, so that the plasticizing cylinder 210 may include multiple compression zones 22 and multiple starvation zones 23.

In the production apparatus 1000, the inner diameter of the plasticizing cylinder 210 was 3.5 cm and the inner diameter of the introducing port 202 was 0.8 cm. Namely, the inner diameter of the introducing port 202 was 23% of the inner diameter of the plasticizing cylinder 210. In this example, it was used the mold having the cavity 253 of which size was 100 mm×200 mm×3 mm.

(2) Production of Foamed Molded Product

In this example, a nitrogen tank filled with nitrogen at 14 MPa was used as the tank 100. At first, the value of the pressure reduction valve 151 was set to 6 MPa and the tank 100 was opened. Then, nitrogen of 6 MPa was supplied to the starvation zone 23 through the introducing port 202 of the plasticizing cylinder 210 via the pressure reduction valve 151 and pressure gauge 152. During production of the molded product, the tank 100 was open at all times.

In the plasticizing cylinder 210, the plasticizing zone 21 was adjusted to 200° C., the compression zone 22 was adjusted to 210° C., the starvation zone 23 was adjusted to 220° C., and the recompression zone 24 was adjusted to 220° C. by the band heater (note depicted in the drawings). Then, the resin material was supplied from the resin supplying hopper 211 and the screw 20 was rotated forwardly. Accordingly, the resin material was heated and kneaded in the plasticizing zone 21 to provide the molten resin containing the chemical foaming agent. The forward rotation of the screw 20 allowed the molten resin to flow from the plasticizing zone 21 to the starvation zone 23 via the compression zone 22.

As depicted in FIG. 3, the molten resin flowed from the compression zone 22 to the starvation zone 23 by passing through the inner diameter of the ring 26 and the clearance 28, thereby restricting the supply amount of the molten resin to the starvation zone 23. This compressed the molten resin in the compression zone 22 positioned upstream of the ring 26 to increase the pressure, and the starvation zone 23 positioned downstream of the ring 26 was not full of the molten resin (the starvation zone 23 was starved of the molten resin). Since the starvation zone 23 was not full of the molten resin (the starvation zone 23 was starved of the molten resin), the fluid (nitrogen) introduced from the introducing port 202 was present in a space where no molten resin was present to pressurize the molten resin.

The molten resin was fed to the recompression zone 24 and recompressed there, and the molten resin for one shot was measured at the forward end of the plasticizing cylinder 210. Then, the shutoff valve 36 was opened and the molten resin was injected to charge the cavity 253 such that the filling rate of the molten resin was 95% with respect to the internal volume of the cavity 253. Accordingly, the foamed molded product in a flat plat shape was molded (short shot method). After cooled, the foamed molded product was taken out from the mold. The cooing time was 20 seconds.

The injection molding of the molded product as described above was continuously performed for 30 shots, thus obtaining 30 pieces of the foamed molded products. The pressure in the starvation zone 23 of the plasticizing cylinder 210 was constantly measured by a pressure sensor 25 during production of the foamed molded products. As a result, the pressure in the starvation zone 23 was fixed, that is, it was constantly 6 MPa. Further, the value of the pressure gauge 152 indicating the pressure of nitrogen supplied to the starvation zone 23 was constantly 6 MPa during production of the foamed molded products. Accordingly, it was confirmed that the molten resin in the starvation zone 23 was continuously pressurized by the nitrogen of 6 MPa during one cycle of the injection molding including the plasticization and measurement steps, injection step, cooling step for the molded product, taking-out step, and the like.

Example 2

In this example, a foamed molded product was produced by using a polypropylene (PP) resin as the thermoplastic resin and sodium hydrogen carbonate that is hydrogen carbonate as the chemical foaming agent similarly to Example 1. Specifically, a resin material was obtained by mixing PP resin pellets ("Prime Polypro J105G" produced by Prime Polymer Co., Ltd.) (pellets A) containing no reinforcing material such as an inorganic filler, master batch pellets ("MP480" produced by LION IDEMITSU COMPOSITES CO., LTD.) (pellets B) containing 80% by weight of talc as the inorganic filler, and master batch pellets ("Cellmike MB" produced by SANKYO KASEI CO., LTD.) (pellets C) containing 20% by weight of sodium hydrogen carbonate powder used in Example 1, and the resin material was made such that the weight ratio between the pellets A and the pellets B was 80:20 and that the content of sodium hydrogen carbonate was 1.0% by weight. The foamed molded product was made from the resin material by use of the production apparatus 1000 used in Example 1. Carbon dioxide was used as the fluid pressurizing a molten resin.

In this example, a carbon dioxide tank filled with carbon dioxide at 6 MPa was used as the tank 100. At first, the value of the pressure reduction valve 151 was set to 3 MPa and the tank 100 was opened. Then, carbon dioxide of 3 MPa was supplied to the starvation zone 23 through the introducing port 202 of the plasticizing cylinder 210 via the pressure reduction valve 151 and pressure gauge 152. During production of the molded product, the tank 100 was open at all times.

Similar to Example 1, the resin material was supplied from the resin supplying hopper 211 into the plasticizing cylinder 210 and the resin material was plasticized and measured in the plasticizing cylinder 210. Then, the shutoff valve 36 was opened and the molten resin was injected to charge the cavity 253 such that the filling rate of the molten resin was 100% with respect to the internal volume of the cavity 253. After elapse of three seconds, the clamping unit 250 was driven to move backward, which opens the mold such that the cavity volume was increased from 100% to 200%. Accordingly, the foamed molded product was molded (core back method). After cooled, the foamed molded product was taken out from the mold. The cooing time was 30 seconds. The molded product of Example 2 using the core back method increased in thickness, thus having a heat insulating effect better than that of Example 1 using the short shot method. Thus, the cooling time in Example 2 was longer than that of Example 1.

The injection molding of the molded product as described above was continuously performed for 30 shots, thus obtaining 30 pieces of the foamed molded products. The pressure in the starvation zone 23 of the plasticizing cylinder 210 was constantly measured by the pressure sensor 25 during production of the foamed molded products. As a result, the pressure in the starvation zone 23 was fixed, that is, it was constantly 3 MPa. Further, the value of the pressure gauge 152 indicating the pressure of carbon dioxide supplied to the starvation zone 23 was constantly 3 MPa during production of the foamed molded products. Accordingly, it was confirmed that the molten resin in the starvation zone 23 was continuously pressurized by the carbon dioxide of 3 MPa during one cycle of the injection molding including the plasticization and measurement steps, injection step, cooling step for the molded product, taking-out step, and the like.

Example 3

In this example, 30 pieces of the foamed molded products were continuously produced in a similar manner as Example 1, except that the value of the pressure reduction value 151 was set to 0.5 MPa.

The pressure in the starvation zone 23 of the plasticizing cylinder 210 was constantly measured by the pressure sensor 25 during production of the foamed molded products. As a result, the pressure in the starvation zone 23 was fixed, that is, it was constantly 0.5 MPa. Further, the value of the pressure gauge 152 indicating the pressure of nitrogen supplied to the starvation zone 23 was constantly 0.5 MPa during production of the foamed molded products. Accordingly, it was confirmed that the molten resin in the starvation zone 23 was continuously pressurized by the nitrogen of 0.5 MPa during one cycle of the injection molding including the plasticization and measurement steps, injection step, cooling step for the molded product, taking-out step, and the like.

Example 4

In this example, 30 pieces of the foamed molded products were continuously produced in a similar manner as Example 1, except that the value of the pressure reduction value 151 was set to 10 MPa. The cooling time for the foamed molded product was 30 seconds.

The pressure in the starvation zone 23 of the plasticizing cylinder 210 was constantly measured by the pressure sensor 25 during production of the foamed molded products. As a result, the pressure in the starvation zone 23 was fixed, that is, it was constantly 10 MPa. Further, the value of the pressure gauge 152 indicating the pressure of nitrogen supplied to the starvation zone 23 was constantly 10 MPa during production of the foamed molded products. Accordingly, it was confirmed that the molten resin in the starvation zone 23 was continuously pressurized by the nitrogen of 10 MPa during one cycle of the injection molding including the plasticization and measurement steps, injection step, cooling step for the molded product, taking-out step, and the like.

Comparative Example 1

In this comparative example, 30 pieces of the foamed molded products were continuously produced in a similar manner as Example 1, except that no chemical foaming agent was used. Specifically, the foamed molded products were made from a resin material consisting of the ABS resin pellets ("TOYOLAC 500" produced by TORAY INDUSTRIES, INC.) containing no chemical foaming agent used in Example 1.

Comparative Example 2

In this comparative example, 30 pieces of the foamed molded products were continuously produced in a similar manner as Example 2, except that the resin material contained 3% by weight of the chemical foaming agent. Specifically, the resin material was obtained by mixing the pellets A, pellets B, and pellets C containing the chemical foaming agent, used in Example 2, and the resin material was made such that the weight ratio between the pellets A and the pellets B was 80:20 and that the content of chemical foaming agent (sodium hydrogen carbonate) was 3% by weight. The foamed molded product was made from the resin material.

Comparative Example 3

In this comparative example, 30 pieces of the foamed molded products were continuously produced in a similar manner as Example 1, except that no fluid was introduced into the plasticizing cylinder 210.

<Evaluation of Foamed Molded Product>

(1) Comparison of Specific Gravity Between Foamed Molded Product and Solid (Non-Foaming Molded Product)

The foamed molded products of Examples 1, 3, 4 and Comparative Example 1 molded by the short shot method each had a specific gravity that was lower, by 5%, than that of a solid (non-foaming molded product) having the same volume. The foamed molded products of Example 2 and Comparative Example 2 molded by the core back method each had a thickness that was twice the thickness of the mold cavity, and had a specific gravity that was lower, by 35%, than that of a solid molded product having the same volume. Meanwhile, in Comparative Example 3, no molded products having sufficient foamed cells were produced due to the occurrence of short shot which will be described later. Thus, regarding the molded products in Comparative Example 3, the specific gravity was not able to be compared with that of the solid.

(2) Average Cell Size of Foamed Molded Products

The average cell size of the foamed molded products obtained in each of the examples and comparative examples was determined by the following method. At first, the cross-section of each foamed molded product obtained in the examples and comparative examples was observed with a microscope. Within a core layer region (a center part of the cross-section of the molded product) with foamed cells, the diameters of the cells that were present in an area of 1 mm×1 mm were measured, and the average value thereof was calculated. TABLE 1 shows the results thereof a surface of the mold cavity was caused by subsidiary products or by-products of the chemical foaming agent.

(6) Cell Density of Foamed Molded Product

Figure 4A:
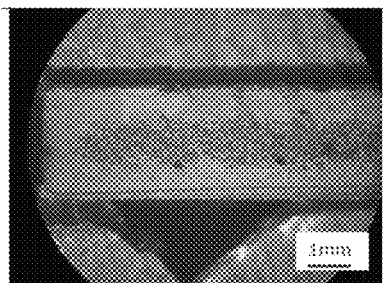
FIG. 4A is an optical micrograph showing a cross-section of a molded product produced in Example 1.
Figure 4A:
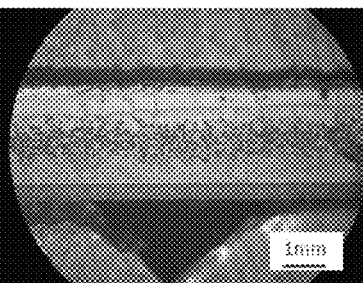
Figure 4A:
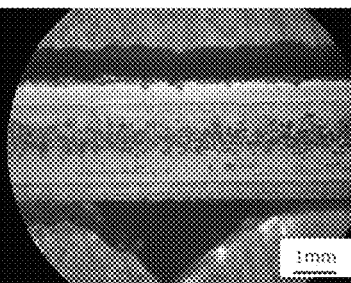
Figure 4B:
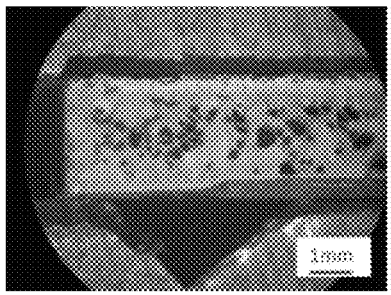
FIG. 4B is an optical micrograph showing a cross-section of a molded product produced in Comparative Example 1.
Figure 4B:
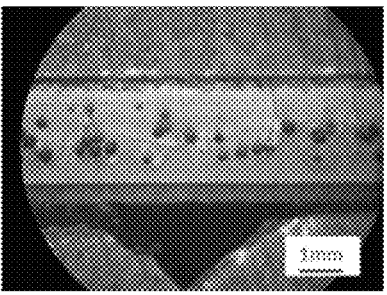
Figure 4B:
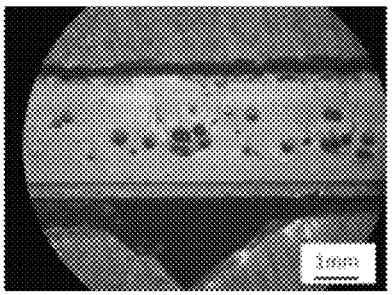
Figure 4C:
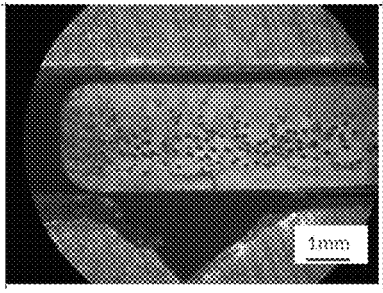
FIG. 4C is an optical micrograph showing a cross-section of a molded product produced in Comparative Example 3.
Figure 4C:
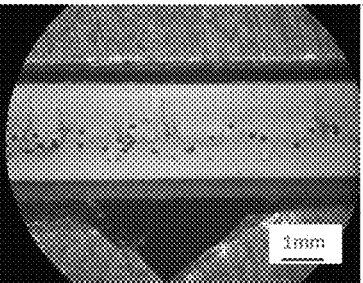
Figure 4C:
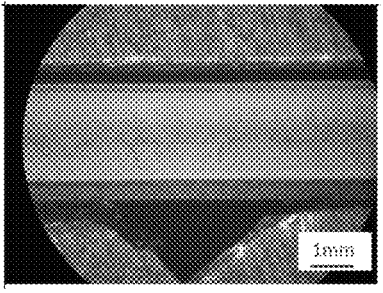

The cell density of each foamed molded product was observed with an optical microscope. The observation was performed for three parts of the cross-section of each molded product including: a part (gate part) positioned in the vicinity of a gate of the mold at the time of injection molding; a part (end or terminal part) positioned in the vicinity of a flow end or flow terminal away from the gate; and a center part of the molded product which is positioned between the gate part and the terminal part. FIG. 4A is a photograph showing the cross-section of a molded product produced in Example 1, FIG. 4B is a photograph showing the cross-section of a molded product produced in Comparative Example 1, and FIG. 4C is a photograph showing the cross-section of a molded product produced in Comparative Example 3.

TABLE 1

|  |  | Examples | | | | Comparative Examples | | |
| --- | --- | --- | --- | --- | --- | --- | --- | --- |
|  |  | 1 | 2 | 3 | 4 | 1 | 2 | 3 |
| Material and production conditions | Thermoplastic resin *1) | ABS | PP | ABS | ABS | ABS | PP | ABS |
|  | Chemical foaming agent (additive amount (% by weight)) | $NaHCO_3$ (0.2) | $NaHCO_3$ (1.0) | $NaHCO_3$ (0.2) | $NaHCO_3$ (0.2) | — | $NaHCO_3$ (3.0) | $NaHCO_3$ (0.2) |
|  | Fluid (pressure (MPa)) | $N_2$ (6) | $CO_2$ (3) | $N_2$ (0.5) | $N_2$ (10) | $N_2$ (6) | $CO_2$ (3) | — |
|  | Foam molding method *2) | SS | CB | SS | SS | SS | CB | SS |
| Evaluation results | Average cell size (μm) | 100 | 100 | 100 | 100 | 300 | 100 | 100 |
|  | Short shot | G | — | G | G | G | — | NG |
|  | Surface property | G | G | G | G | NG | G | G |
|  | Contaminant in mold | G | G | G | G | G | NG | G |

*1) ABS: acrylonitrile-butadiene-styrene copolymer PP: polypropylene
*2) SS: short shot method CB: core back method (3) Presence or Absence of Short Shot The foamed molded products in Examples 1, 3, 4 and Comparative Examples 1 and 3 molded by the short shot method were visually checked to confirm whether the short shot (charging failure) occurred. In TABLE 1, "G" indicates that no short shot was observed and "NG" indicates that short shot was observed. The short shot occurred when the molten resin had insufficient foaming performance.

(4) Surface Property of Foamed Molded Product

The foamed molded products were visually checked to confirm whether swelling of a surface of the foamed molded product and a swirl mark were caused. In TABLE 1, "G" indicates that neither swelling nor swirl mark was observed and "NG" indicates that swelling or swirl mark was observed. The swelling and/or swirl mark was caused by separation of the fluid from the molten resin injected into the mold.

(5) Contaminant in Mold

After performing the continuous injection molding 30 times, it was visually checked whether or not a contamination adhered to a surface of the mold cavity. In TABLE 1, "G" indicates that no contamination adhering to a surface of the mold cavity was observed and "NG" indicates the contamination was observed. The contamination adhering to As indicated in TABLE 1, regarding each of Examples 1 to 4, the average cell size was small (approximately 100 μm) and occurrence of the short shot, swelling of the mold product surface, the swirl mark, and contamination in the mold were not observed. Further as shown in FIG. 4A, regarding each foamed molded product produced in Examples 1 to 4, the cell density and cell size were uniform, the foamed cell density was high, and the foaming condition was good, in the gate part, the center part, and the terminal part.

Meanwhile, Example 3 in which the pressure of fluid was 0.5 MPa, the cell density thereof was slightly lower than those of Examples 1 and 2. The reason thereof is assumed as follows. Namely, since the pressure of fluid functioning as the physical foaming agent in Example 3 was lower than those in Examples 1 and 2, the foaming performance of Example 3 was inferior to those of Examples 1 and 2. Regarding Example 4 in which the pressure of fluid was 10 MPa, the pressure of fluid was high, which was liable to cause swelling of the molded product. In order to prevent the swelling, the cooling time for Example 4 was required to be longer than that for Example 1, thereby slightly reducing production efficiency of Example 4. As understood from the above results, the pressure of fluid pressurizing the molten resin may be preferably in a range of 1 to 6 MPa, more preferably in a range of 3 to 6 MPa from a viewpoint of efficiently producing the foamed molded products with higher cell density.

Meanwhile, in Comparative Example 1 using no chemical foaming agent, as indicated in TABLE 1, the average cell size was large (300 μm) and the surface property thereof was bad due to occurrence of the swirl mark and swelling. Further, as shown in FIG. 4B, regarding each molded product produced in Comparative Example 1, the cell size of the gate part was slightly larger than those of the center part and terminal part, the cell density was low, and the foaming property was inferior to those of Example 1 to 4. In Comparative Example 2 in which the content of the chemical foaming agent was 3% by weight, as indicated in TABLE 1, the contamination adhered to a surface of the mold cavity. The contamination also adhered to a surface of the foamed molded product, resulting in an unsatisfactory appearance of the foamed molded product. In Comparative Example 3 in which the fluid did not pressurize the molten resin, as indicated in TABLE 1, the short shot occurred. As depicted in FIG. 4C, although some foamed cells were observed in the terminal part in which filling pressure at the time of injection molding was low, the foamed cells were hardly observed in the gate part and the foaming condition was bad.

According to the production method of the present teaching, it is possible to reduce the content of the chemical foaming agent in the resin material and to simplify any apparatus and mechanism related to the physical foaming agent. Thus, the foamed molded product excellent in foaming property can be efficiently produced at low cost.

What is claimed is:

1. A method of producing a foamed molded product, the method comprising:
    providing a plasticizing cylinder in which a screw is provided, which is configured to plasticize and melt a resin material containing a thermoplastic resin and a chemical foaming agent to provide a molten resin, and which has a starvation zone, the starvation zone being not full of the molten resin;
    plasticizing and melting the resin material in the plasticizing cylinder, to provide a molten resin containing the chemical foaming agent;
    supplying a fluid with a fixed pressure into the plasticizing cylinder to pressurize the molten resin in the starvation zone; and
    performing foam molding of the molten resin,
    wherein the resin material contains 0.1 to 2% by weight of the chemical foaming agent, and pressure in the starvation zone is kept at the fixed pressure.

2. The method according to claim 1, wherein the fixed pressure is in a range of 1 to 10 MPa.

3. The method according to claim 1, wherein the fluid is a physical foaming agent.

4. The method according to claim 1, wherein the fluid with the fixed pressure is carbon dioxide, nitrogen, or air.

5. The method according to claim 1, further comprising taking out the fluid which has been depressurized to the fixed pressure by a pressure reduction valve, from a tank or bottle storing the fluid,
    wherein the molten resin is pressurized by the fluid taken out from the tank.

6. The method according to claim 1, wherein the molten resin in the starvation zone is pressurized by the fluid at the fixed pressure.

7. The method according to claim 6, wherein the molten resin in the starvation zone is in contact with the fluid at the fixed pressure.

8. The method according to claim 6, wherein the plasticizing cylinder is provided with a mechanism configured to increase flow resistance of the molten resin on an upstream side of the starvation zone in a flowing direction of the molten resin.

9. The method according to claim 6, wherein, in the plasticizing cylinder, a compression zone and the starvation zone are provided to be adjacent to each other in that order from an upstream side in a flowing direction of the molten resin, and
    a mechanism configured to increase flow resistance of the molten resin is provided between the compression zone and the starvation zone so that pressure of the molten resin in the compression zone is increased and the starvation zone is not full of the molten resin.

10. The method according to claim 6, wherein the starvation zone of the plasticizing cylinder is provided with an introducing port through which the fluid is introduced into the starvation zone, and
    the fluid is introduced from the introducing port to the starvation zone at the fixed pressure.

11. The method according to claim 1, wherein the fluid with the fixed pressure is continuously supplied into the plasticizing cylinder during production of the foamed molded product.

12. The method according to claim 1, wherein the resin material is plasticized and melted and the foam molding of the molten resin is performed while the fluid with the fixed pressure is continuously supplied into the plasticizing cylinder.

13. The method according to claim 1, wherein pressurizing the molten resin corresponds to pressurizing the molten resin at the fixed pressure by continuously supplying the fluid with the fixed pressure into the plasticizing cylinder while flowing the molten resin in a predefined flowing direction in the plasticizing cylinder.

14. A production apparatus for a foamed molded product, comprising:
    a plasticizing cylinder configured to plasticize and melt a resin material to provide a molten resin and including a starvation zone which is not full of the molten resin, and
    a fluid supply mechanism configured to continuously supply a fluid with a fixed pressure to the starvation zone of the plasticizing cylinder during production of the foamed molded product.

15. The production apparatus according to claim 14, wherein the plasticizing cylinder further includes a mechanism configured to increase flow resistance of the molten resin at an upstream side of the starvation zone in a flowing direction of the molten resin.

16. The production apparatus according to claim 14, wherein the plasticizing cylinder further includes a compression zone provided to be adjacent to the starvation zone at an upstream side of the starvation zone in a flowing direction of the molten resin and a mechanism provided between the compression zone and the starvation zone to increase flow resistance of the molten resin, and
    the mechanism is configured to increase pressure of the molten resin in the compression zone and not to be full of the molten resin in the starvation zone.

17. The production apparatus according to claim 14, wherein the starvation zone of the plasticizing cylinder is provided with an introducing port through which the fluid is introduced into the starvation zone.

18. The production apparatus according to claim 17, wherein the introducing port has an inner diameter which is 15 to 100% of an inner diameter of the plasticizing cylinder.

19. The production apparatus according to claim 17, wherein no driving valve is provided in the introducing port.

\* \* \* \* \*